United States Patent [19]

Goldrian et al.

[11] Patent Number: 6,026,448
[45] Date of Patent: Feb. 15, 2000

[54] METHOD AND MEANS FOR EXCHANGING MESSAGES, RESPONSES AND DATA BETWEEN DIFFERENT COMPUTER SYSTEMS THAT REQUIRE A PLURALITY OF COMMUNICATION PATHS BETWEEN THEM

[75] Inventors: Gottfried Goldrian, Böblingen; Jürgen Märgner, Sindelfingen, both of Germany

[73] Assignee: International Business Machines Corporation, Armonk, N.Y.

[21] Appl. No.: 08/929,203

[22] Filed: Sep. 9, 1997

[30] Foreign Application Priority Data

Aug. 27, 1997 [EP] European Pat. Off. ............. 97114824

[51] Int. Cl.⁷ ................................................... G06F 13/00
[52] U.S. Cl. ......................... 709/712; 709/200; 709/212; 709/213; 709/214; 709/216; 711/100; 711/111; 711/112; 710/1; 710/22; 395/500.46
[58] Field of Search ......................... 395/200.43, 200.46, 395/200.42, 500.46; 709/200, 206, 212, 213, 216, 217, 214, 228; 710/1, 22, 10, 104, 266; 711/100, 118, 111, 112, 121, 141, 147, 146

[56] References Cited

U.S. PATENT DOCUMENTS 3,976,979  8/1976  Parkinson et al. .................... 340/172.5
4,413,319  11/1983  Schultz et al. ............................ 710/30
4,503,496  3/1985  Holzner et al. ........................... 364/200
5,555,420  9/1996  Sarangdhar et al. ..................... 710/266
5,617,537  4/1997  Yamada et al. .......................... 709/214
5,634,099  5/1997  Andrews et al. ................... 395/200.42
5,673,413  9/1997  Deshpande et al. ..................... 711/141
5,742,843  4/1998  Koyanagi et al. ........................ 712/14
5,884,313  3/1999  Talluri et al. ............................. 707/10
5,887,146  3/1999  Baxter et al. ............................ 710/104

FOREIGN PATENT DOCUMENTS

0 646 876 A1  4/1995  European Pat. Off. ........ G06F 15/16

Primary Examiner—Frank J. Asta
Assistant Examiner—William C. Vaughn, Jr.
Attorney, Agent, or Firm—Lynn L. Augspurger

[57] ABSTRACT

A method and means for exchanging messages between a multitude of computer systems is provided, whereby the sender system's memory is used as a buffer for the message to be transferred. The method comprises a first step of writing data into a portion of the sender system's memory, a second step of setting an indication signal in the receiver system, and a third step of performing a remote read access to the data in the sender system's memory. Thus, the message buffers of prior art solutions have been replaced by portions of the sender system's memory. The remote read access is performed by a direct memory adapter (DMA) in the receiver system, whereby said indication signal is mapped to the start address of said portion of the sender system's memory. Because any write access to a remote system's memory is forbidden, data integrity is preserved.

7 Claims, 5 Drawing Sheets

METHOD AND MEANS FOR EXCHANGING MESSAGES, RESPONSES AND DATA BETWEEN DIFFERENT COMPUTER SYSTEMS THAT REQUIRE A PLURALITY OF COMMUNICATION PATHS BETWEEN THEM

FIELD OF THE INVENTION

The invention is related to a method and means for message passing between different computer systems. In particular, a method and means for message passing between multiprocessor systems requiring a plurality of communication paths between them is given.

BACKGROUND OF THE INVENTION

There exist a variety of schemes for message passing. The term "message passing" usually refers to an exchange of requests, responses and data between different computer systems. The requests and responses are queued up in each computer system, and there do exist arbitration means and routing means which forward the requests and responses to other computer systems.

One method for handling data exchange between different computer systems is to connect all the computer systems to one central system having a central memory. This central computer system, to which all the other computer systems are attached, is referred to as a "Coupling Facility". Message passing between different attached computer systems takes place by writing to and reading from said central system's memory. To each shared data structure in the memory of the coupling facility, different access keys and locks may be assigned, in a way that only a subset of the peripheral computer systems is allowed to perform read- and/or write-accesses to said data structures.

Such a solution is described in U.S. Pat. No. 5,561,809 "Communicating messages between processors and a coupling facility", to M. D. Swanson, B. B. Moore, J. A. Williams, J. F. Isenberg, A. A. Helffrich, D. A. Elko, and J. M. Nick. Here, data messages and responses are passed between the main storage of the respective computer system and the "structured external storage device" of the coupling facility by sub-channel means. In order to provide an arbitration mechanism, a completion vector exists having a bit which is set to its first condition when a message operation is started, and which is reset to its second condition when said message operation is completed. The state of said completion vector is polled periodically by the computer system that has started a message operation, in order to determine whether said message operation has completed.

The messages are to be passed from a first computer system to a second computer system via the coupling facility's central memory. The first computer system has to write its message to the central memory, and the second computer system has to fetch it from there. Therefore, the latency for message passing is high, because sequential write- and read-access to the coupling facility's central memory is necessary. Furtheron such a solution only makes sense for a multitude of computer systems being coupled to one central system. A coupling facility with only one or two attached computer systems does not make sense.

In order to couple computer systems, it has been proposed that one computer system may access the memory of its peer computer systems. The access to a "foreign" system's memory is forwarded to said memory via a so-called NUMA switch (Non-Uniform Memory Access). This means that each computer system can, with a low latency, access its own memory, and it can, with a somewhat higher latency, access the memories of its peer computer systems. Both read- and write-accesses to foreign memories are permitted. In order to take care of data integrity, it is necessary to keep track of the different intersystem accesses. This is done by assigning a directory to the NUMA-switch in which the status of all datalines in the different systems' memories is recorded. This shows one disadvantage of such a solution: A rather high amount of extra hardware is required, and complex routines have to be installed in order to preserve data integrity. By granting write authority for the own system's memory to other computer systems, the danger of hazards is increased.

Another method for passing messages between computer systems that is known from the prior art is to couple said computer systems by attaching a switch to both the I/O interface of the first and the I/O interface of the second computer system. In the IBM S/390 multiprocessor systems, the so-called "channel" connects I/O devices such as DASDs to the computer system's I/O adapters. The term "channel" refers both to the fiber link that connects the I/O devices to the computer system and to the transfer protocol employed on said fiber link. The channel is capable of serially transmitting 200 MBit of data per second. Per S/390 computer system, there may exist up to 256 channels.

It is possible to couple a computer system 1 with a computer system 2 by attaching one of the channels of computer system 1 and one of the channels of computer system 2 to a common channel switch. Thus, computer system 1 may access the I/O devices that are attached to computer system 2, and vice versa. Any of the computer systems can thus access any I/O device, no matter to which computer system said I/O device is attached. But besides addressing remote I/O devices, it is also possible, with said channel switch, to access the memory of any other computer system, and to perform remote read- and/or write-accesses to the other computer system's memory. Let us consider the case that computer system 1 has to pass a message to computer system 2. Said message has to be forwarded, via the I/O adapter of computer system 1, via a channel of computer system 1, via the channel switch, via a channel of computer system 2, and via the I/O adapter of computer system 2, to the memory of computer system 2. As this communication path is very long, message passing takes a long time and therefore, the main disadvantage of this method is its high latency. Another disadvantage is that each computer system is allowed to perform, via the channel switch, write-accesses to a "foreign" computer system, and therefore, hazards may occur. A faulty external write-access to the memory of one of the computer systems might destroy data integrity. Furtheron, message passing via a channel switch is only possible in case each of the computer systems is equipped with said channel links. There also exist less expensive solutions that allow to directly connect SCSI devices to the computer system's I/O adapters. For such "small" solutions, message passing via a channel switch is not possible anyway.

In U.S. Pat. No. 5,412,803 "High performance intersystem communication for data processing systems", to R. S. Capowsky, P. J. Brown, I. T. Fasano, T. A. Gregg, D. W. Westcott, N. G. Bartow and G. Salyer, a message passing scheme is proposed where dedicated buffers assigned to the node processors are used as mailboxes where the messages can be put by the connected node processors. Here, an originator buffer in a message originator element and a recipient buffer in a message recipient element are provided for message passing, whereby each of said originator buffers and each of said recipient buffers is composed of three logical areas, a request area, a response area, and a data area, and whereby a transmission path connects said originator buffer to said recipient buffer. A message request is transferred from the request area of the originator buffer to the request area of the recipient buffer and optionally, message data is transferred from the data area of the originator buffer to the data area of the connected recipient buffer. The message recipient element may respond by transferring a message response from the response area of the recipient buffer to the response area of the originator buffer, and, optionally, transfer message data from the data area of the recipient buffer to the data area of the originator buffer. Requests and responses have to queue up and are executed in sequence. A rather complicated message-time-out procedure is initiated each time a message is transmitted. A second disadvantage is that, in case there exist a multitude of communication paths between two computer systems, a large amount of buffers have to be provided. As each buffer is segmented into three logical areas, a lot of extra hardware is required, and therefore, this solution is rather expensive, and it uses a lot of valuable chip space. The problems that emerge when a "foreign" computer system performs a write access to the own system's memory are not received by this solution.

OBJECT OF THE INVENTION

It is therefore an object of the invention to provide a method and means for message passing between computer systems that avoids the drawbacks of prior art solutions, and, in particular, to provide a method and means for intersystem message passing allowing for a low latency data transfer.

It is another object of the invention to provide a method and means for message passing between computer system that avoids difficult arbitration, routing and time-out procedures.

It is another object of the invention to provide a method and means for message passing between computer systems that avoids granting write authority for the own computer system's memory to any remote computer system.

It is another object of the invention to provide a method and means for message passing between computer systems which does not require a lot of extra hardware, especially in case there exist a multitude of different communication paths between said computer systems.

SUMMARY OF THE INVENTION

The object of the invention is solved by a method for exchanging data between a computer system A and a computer system B according to claim 1, and by data exchange means for exchanging messages between a computer system A and a computer system B according to claim 11.

The method proposed allows for a low latency message passing between a multitude of computer systems. Messages that are to be transmitted and that are stored to the sender system's memory can be obtained by the receiver system performing a direct memory access to the sender system's memory. Thus, messages are transferred quickly in one single data transfer.

Another advantage is that the method proposed only requires read accesses to a remote system's memory. Write accesses to foreign systems are forbidden, and thus, hazards are avoided and data integrity is preserved. The risk of a faulty remote write access that destroys useful data in the own system's memory does not exist with the solution proposed.

According to the invention, the method for exchanging data between computer systems only requires circuitry for setting and resetting indication signals in the receiver system, and circuitry for performing a remote read access to the sender system's memory, which could for example be a direct memory adapter (DMA). While prior art solutions use message buffers in order to provide the communication areas necessary for message passing, the intention utilizes portions of the sender system's memory for buffering messages that are to be transmitted. Thus, said message buffers are replaced by communication areas in the sender system's memory, and they can be omitted. This is especially advantageous in case there exist a large number of communication paths, with each path requiring a dedicated message buffer. A further advantage of using the memory as a communication area is that a larger size of the message packets can be chosen, as the portion of the memory reserved for communication purposes provides a lot more storage space than said dedicated message buffers.

By providing several memory portions, and several indication signals in the receiver, a multitude of communication paths using the method of claim 1 may coexist. This avoids difficult queuing procedures and speeds up message transfer. The receiver system can access different messages in different portions of the sender system's memory according to the respective indication signals.

In a further embodiment of the invention, an interrupt to the receiver computer system is initiated as soon as the indication signal has been set.

By means of this interrupt, the processor in the receiver system is informed that there is a message to be fetched from the sender system's memory. Alternatively, the processor of the receiver system could poll the status of said indication signals in regular intervals. This would use up a lot of processor time, and therefore, an interrupt to the receiver system's processor is a better solution. The processor can perform other tasks until the interrupt occurs.

In a further embodiment of the invention, the indication signal in the receiver system is translated into a start address of the portion of the sender system's memory where the message is contained. Thus, it is possible to determine, in a single translation step, the remote memory address to which the read access has to be directed. In case the communication area in the sender system's memory has to be moved or in case the partitioning of the sender system's memory is modified, the address translation can easily be modified accordingly. By assigning different start addresses in the remote system's memory to different indication signals, it is possible to keep track of a variety of different communication paths.

In a further embodiment of the invention, a busy signal is set when data exchange is started, and said busy signal is reset when data exchange is completed. Using a busy signal allows for a simple arbitration procedure, in case different facilities intend to use one and the same communication path at the same time. In this case, said busy signal allows for an unambiguous assignment of said communication path. After the busy signal has been reset, the path can be used by another facility.

In a further embodiment of the invention, the indication signal is implemented as a vector of indication bits, with each of the indication bits corresponding to one communication path. As each of the indication bits corresponds to a defined path, the receiver system can map said indication bit to a start address of a portion in the sender system's memory where the message that is to be fetched is buffered. Thus, each status of the vector of indication bits can be translated into a memory address of the remote system that is to accessed. This allows for a simple handling of several "parallel" communication paths.

DETAILED DESCRIPTION OF THE INVENTION

Figure 1:
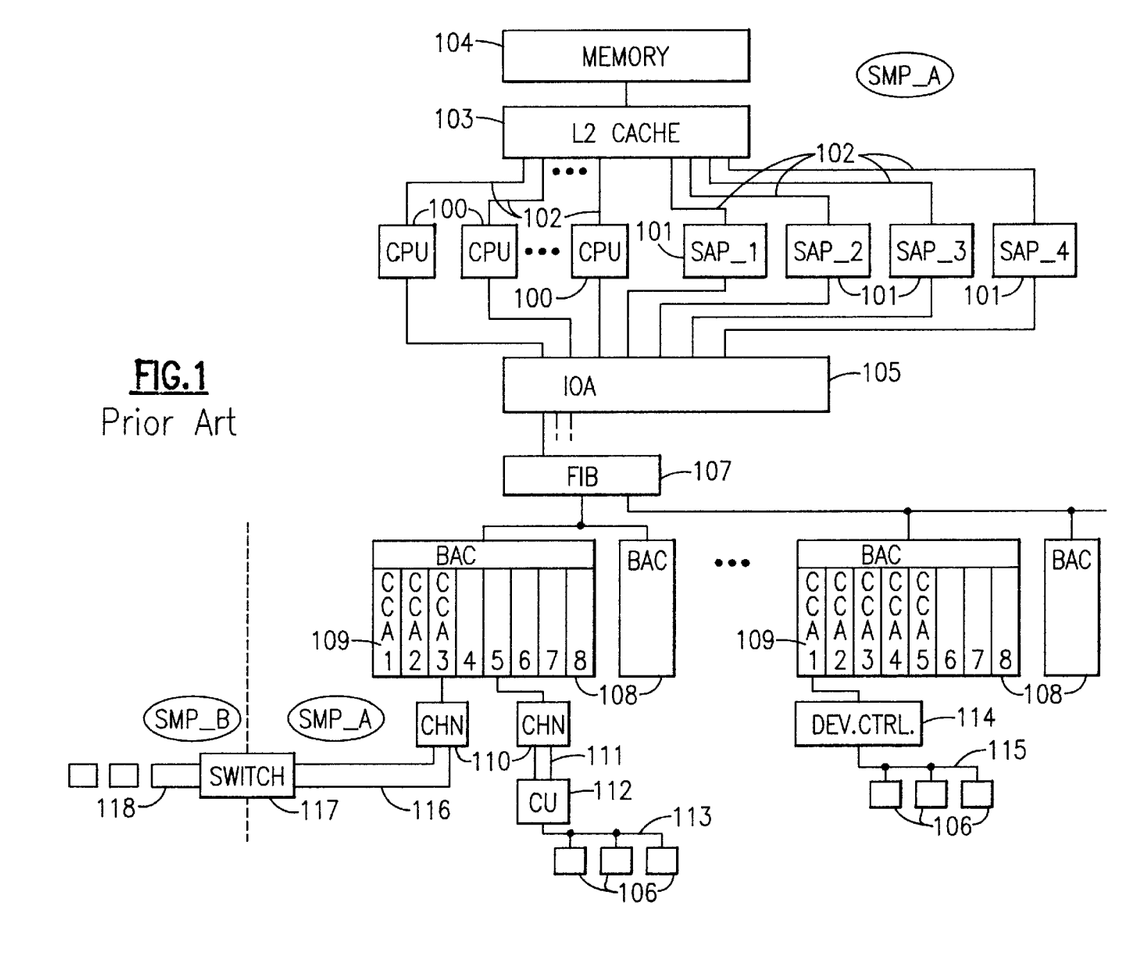
FIG. 1 shows a multiprocessor system SMP__A, which is coupled, via an intersystem channel switch, to a second multiprocessor system SMP__B, in order to allow for message passing between said two computer systems.

In FIG. 1, it is shown how a multiprocessor system can be coupled, via its I/O subsystem and via a channel switch, to another computer system, in order to exchange messages with the other system. Though this solution is known from the prior art, it allows to gain some insight into how message passing works.

A number of CPUs (Central Processing Units, 100), and a number of system assist processors SAP__1, SAP__2, SAP__3 and SAP__4 (101) are connected via processor busses (102) to a shared level 2 cache (103). This level 2 cache fetches cache lines from and stores cache lines to a main memory (104). The system assist processors (101) are responsible for managing the data exchange between memory (104) and the I/O subsystem. Whenever the memory requests certain data, said data, which is contained on magnetic media (e.g. DASDs, 106) has to be provided to the memory.

A number of I/O adapters (105) serve as the interface to the I/O subsystem; they contain status bits that monitor the actual state of the I/O subsystem and they exchange requests and responses with the system assist processors (101). Each I/O adapter addresses a hierarchy of different I/O chips; in our example, the hierarchy of I/O chips of the S/390 system is shown. Here, the I/O adapter addresses a FIB-chip (Fast Internal Bus Chip, 107), and this FIB-chip addresses a number of BACs (Bus Adapter Chips, 108). To each BAC, up to 8 channel adapters CHN (110) can be coupled. Communication via the FIB-chip 107 and the BAC-chip 108 to the channel adapter CHN (110) takes place via the CCAs (Channel Communication Areas, 109), which serve as first-in first-out (FIFO) buffers for commands, addresses and status information. There exists one channel communication area (109) per attached channel adapter CHN (110), which is a 8-byte-wide register implemented in the support hardware. Since there is only one CCA for the messages in both directions, the right to load the channel communication area is controlled by a busy bit.

The "channel" (111), a fiber link capable of serially transmitting 200 MBit of data per second, is attached to one of the channel adapters 110. Via the channel, data can be transmitted over distances of up to 20 km without repeater stations. The channel 111 is connected to a control unit (CU, 112), which converts the channel protocol to a device level protocol suitable for the attached devices 106. To the bus 113, a number of, for example, DASDs (106) is attached. Data that is to be stored to a DASD is transmitted, via said channel 111, to the control unit 112, where it is converted to the device level protocol, and it is forwarded, via link 113, to the respective device.

Vice versa, I/O traffic that is to be forwarded to the computer system is first transmitted, via the device level protocol, to the control unit 112. There, it is converted to the channel protocol, and the I/O data is transmitted via channel 111 and channel adapter 110 to the computer system.

A cheaper way of attaching magnetic devices to the BAC is the use of device controllers (114). These device controllers are connected to a BAC and the BAC's channel communication area and convert the incoming data stream directly to the device level protocol, such as SCSI (Small Computer System Interface, 115). Again, a number of I/O devices 106 can be attached to the SCSI bus 115. In this communication path, the channel adapter, the channel and the control unit have been replaced by a single device controller 114. The advantage of this solution is that it is much cheaper than using the channel, the disadvantage is that a certain maximum distance between the magnetic devices and the computer must not be exceeded.

So far, it has been described how I/O devices can be connected to a computer system. But the channels can also be used for providing, via a channel switch, an intersystem link between two computer systems. In FIG. 1, it is depicted, how such a link is connected to the CCA3 of one of the BACs 108. The channel adapter 110 converts the data flow to the channel protocol and directs the data, via the channel link 116, to the channel switch 117. Via another channel connection (118), switch 117 is connected, in a similar way, to multiprocessor system SMP__B ("SMP" stands for "Symmetrical Multiprocessors/Multiprocessing"). By means of this intersystem link, SMP__B can access the I/O devices (106) of SMP__A, and vice versa. Thus, I/O devices, and data stored on said devices, can be shared between different computer systems.

Besides a remote access to I/O devices of another computer system, the channel switch (116, 117, 118) can also be utilized for message passing between the systems' memories. In order to do so, SMP__A forwards data from the memory 104, via one of its SAPs, via IOA 105, and via FIB 107, to the channel communication area of the BAC-chip 108 that corresponds to the channel switch. From there, the message is forwarded, via the channel adapter 110, the channel 116, the switch 117 and the channel 118, from SMP__A to SMP__3. In SMP__B, the received data is passed, via a CCA of one of the BACs of SMP__B, to the memory of SMP__B. Of course, in the opposite direction, from SMP__B to SMP__A, the same message passing mechanism is possible. The disadvantage of this scheme for message passing is that the latency involved is rather high, due to the very long communication paths.

Figure 2:
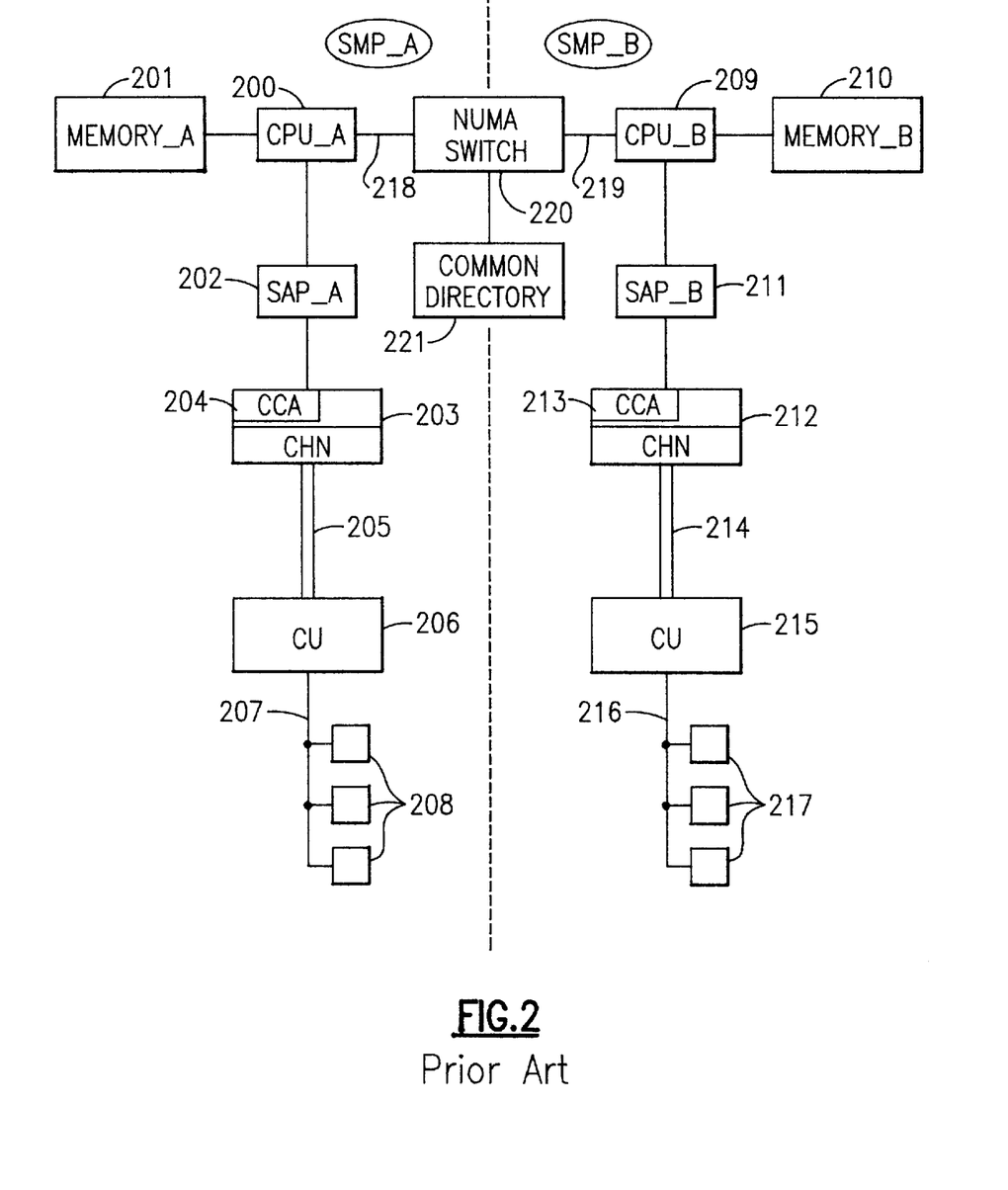
FIG. 2 shows two computer systems SMP__A and SMP__B being connected by means of a NUMA-switch (Non-Uniform Memory Access), which allows each computer system to access both the own and the remote system's main memory.

In FIG. 2, another prior art solution is depicted. Here, two computer systems, SMP__A and SMP__B, are connected by means of a NUMA-switch (220), to which a common directory (221) is attached.

Each of the computer systems comprises at least one central processing unit (CPU_A 200 in SMP_A, CPU_B 209 in SMP_B), which is connected to the respective computer system's main memory (MEMORY_A 201 in SMP_A, MEMORY_B 210 in SMP_B). Each of the computer systems comprises at least one system assist processor (SAP_A 202, SAP_B 211), which is connected, via a channel communication area (CCA 204, CCA 213), to a respective channel adapter (CHN 203, CHN 212). The channel adapter (203, 212) establishes a connection to the channel (205, 214), and said channel connects the computer system, via a control unit (CU 206, CU 215) to a set of magnetic devices (208, 217). The control unit transforms the channel protocol to a device level protocol (207, 216).

Each of the computer systems is linked (218, 219) to a NUMA switch 220, whereby "NUMA" stands for "Non-Uniform Memory Access". This means that SMP_A can perform read- and/or write-accesses to MEMORY_B (210), which are forwarded to SMP_B via the link 218, the NUMA switch 220 and the link 219. Vice versa, SMP_B can perform read- and/or write-accesses to the MEMORY_A (201) of SMP_A via the link 219, the NUMA switch 220 and the link 218. The latency of an access to the system's own memory is lower than the latency of an access to the memory of a remote system. Accesses that are directed via the NUMA switch 220 generally have a higher latency. Therefore, because of the different access latencies involved, the memory access is referred to as a "non-uniform memory access".

In case copies of one and the same data line exist in both MEMORY_A (201) and MEMORY_B (210), it is necessary to keep track of the most recent copy of said data line. By means of a common directory 221, it is possible to keep track of the validity of data lines in both MEMORY_A and MEMORY_B. As soon as remote write-accesses to a computer system's memory are allowed, strategies for maintaining data integrity and for keeping track of the most recently modified dataline have to be installed. Anyway, by allowing remote write accesses, the danger of hazards is significantly increased. For the sake of data safety, it would be advantageous to forbid remote write-accesses to memory. A further disadvantage of an intersystem data exchange via a NUMA-switch is that additional hardware, the common directory, is required.

Figure 3:
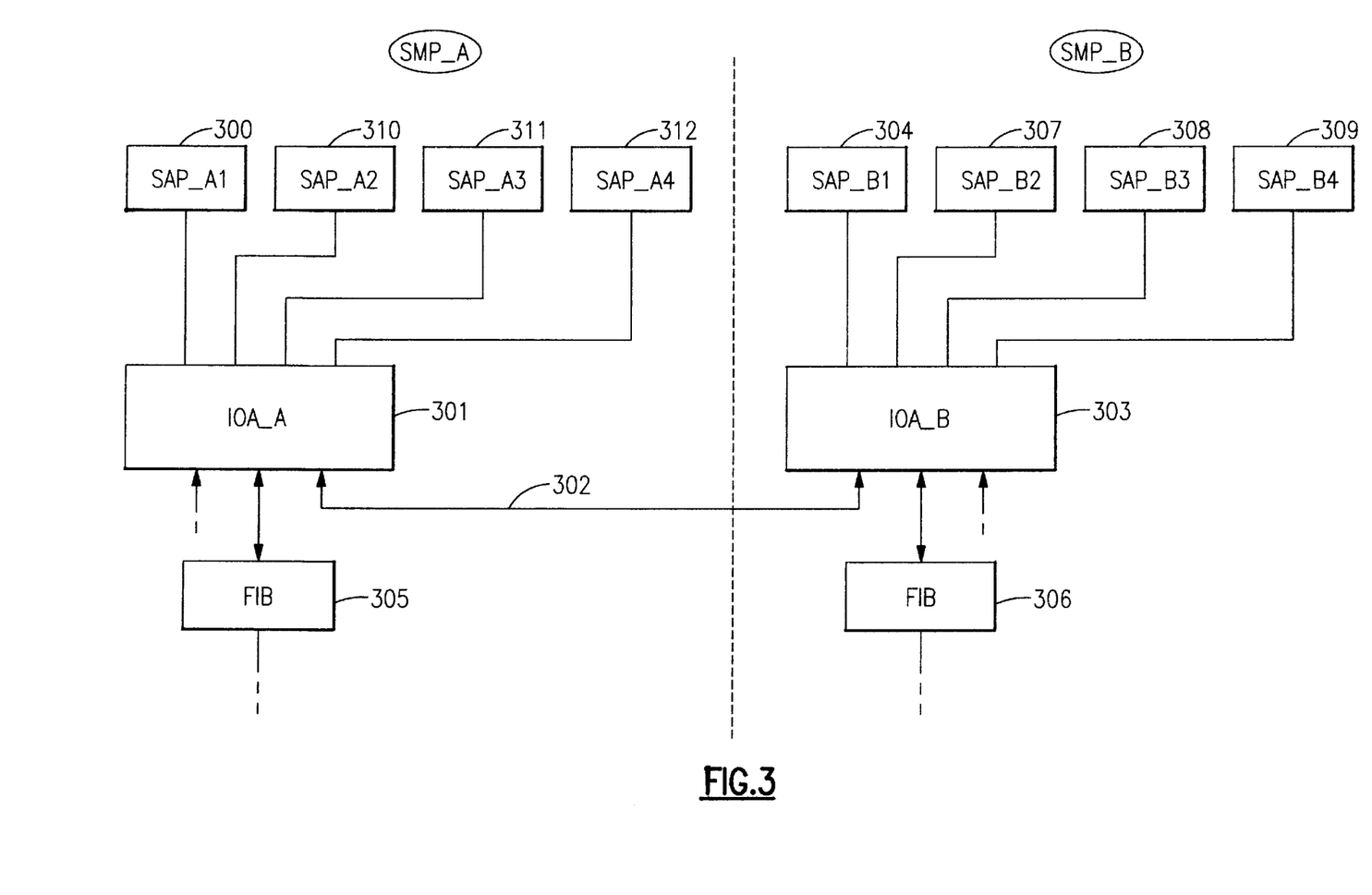
FIG. 3 shows that a large number of communication paths has to be provided in order to be able to connect each system assist processor of SMP__A to each system assist processor of SMP__B, and vice versa.

In FIG. 3, the scheme for message passing between two computer systems according to the invention is shown, whereby an I/O adapter IOA_A (301) of SMP_A is connected, via a cable link 302, to an I/O adapter IOA_B (303) of SMP_B. Besides said link 302, a hierarchy of I/O control chips, such as FIB-chips (305, 306), BAC-chips, channel adapters, etc. are connected to the I/O adapters. In S/390 systems, up to 4 system assist processors can be attached to an I/O adapter. In order to determine the number of communication paths required between two computer systems SMP_A and SMP_B, our example shows four system assist processors, SAP_A1, SAP_A2, SAP_A3 and SAP_A4 (300, 310, 311, 312) which are attached to IOA_A (301), and four system assist processors SAP_B1, SAP_B2, SAP_B3 and SAP_B4 (304, 307, 308, 309), that are coupled to the I/O adapter IOA_B (303).

Let us first consider the case that SAP_A1 (300) has to send a message to SAP_B1 (304). A communication path from SAP_A1 (300), via IOA_A (301), via the link 302, via I/O adapter IOA_B (303) to SAP_B1 (304) has to be established. In case SAP_A1 (300) has to forward a message to SAP_B2 (307) of SMP_B, a different communication path has to be provided. The same is true for a message that has to be passed from SAP_A1 (300) to either SAP_B3 (308) or SAP_B4 (309). Therefor, four different communication paths have to be provided for messages which are initiated by SAP_A3 (300). The system assist processors SAP_A2 (310), SAP_A3 (311), and SAP_A4 (312) also issue messages, which may be directed to any of the system assist processors attached to IOA_B (303) of SMP_B. Therefor, a total of 4×4=16 different communication paths have to be provided in order to take care of messages that were initiated by any of the system assist processors of SMP_A.

In case any of the system assist processors of SMP_B intends to send a message to SMP_A, a communication path from the respective system assist processor, via IOA_B (303), via the link 302, and via IOA_A (301), to the destination system assist processor of SMP_A has to be provided. Thus, another 4×4=16 communication paths are required in order to be able to take care of messages that stem from any of SMP_B's system assist processors. A total of 32 communication paths results. According to conventional message passing schemes, 32 channel communication area would be required in order to buffer incoming and outgoing messages, 16 in IOA_A (301) and 16 in IOA_B (303). In order to provide these 16 buffers, each I/O adapter would have to accommodate a large number of extra latches, which is expensive and uses up a lot of chip space.

The invention idea is to substitute each of the CCAs by two interrupt latches, one busy latch, and a communication area in the SMP's main memory. To each interrupt latch, an address is assigned which points to a segment in the SMP's main memory serving as a communication area. By transferring the communication area from the I/O adapter to the main memory, it is possible to increase the size of this communication area from a few bytes to, for example, one cache line. Thus, a higher performance in message passing can be achieved, as compared to message passing via a communication area in the IOA. With a few message transfers, large amounts of data can be passed from one computer system to the other.

Figure 4:
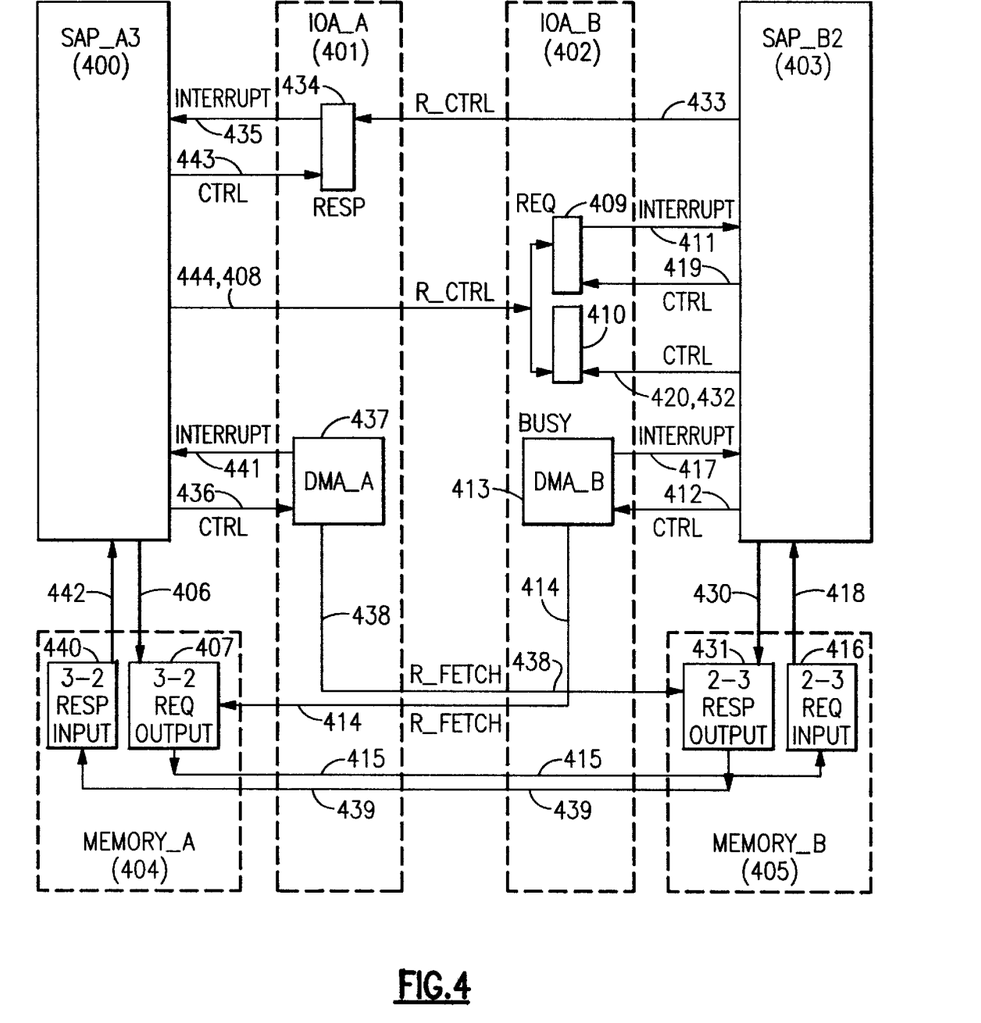
FIG. 4 shows how, according to the invention, a request is passed from SAP__A3 of system SMP__A to SAP__B2 of system SMP__B, and how the respective response of SAP__B2 is passed to SAP__A3.

In FIG. 4, the scheme for message passing according to the invention is shown. Both a request message and a response message are exchanged between a system SMP_A (left half of FIG. 4) and a system SMP_B (right half of FIG. 4). For each SMP, the part of the hardware that contributes to the communication path is shown. In SMP_A, the system assist processor SAP_A3 (400) intends to send a message to the system assist processor SAP_B2 (403) of SMP_B. Correspondingly, SAP_B2 (403) will send a response to SAP_A3 (400). Besides SAP_A3 (400) and SAP_B2 (403), both the I/O adapters IOA_A (401) of SMP_A and IOA_B (402) of SMP_B are part of the communication path between SMP_A and SMP_B. Of course, each of the system assist processors involved may exchange data with the memory of its multiprocessor system, which is MEMORY_A (404) in case of SAP_A3 (400) and which is MEMORY_B (405) in case of SAP_B2 (403).

FIrst, it will be discussed how SAP_A3 (400) passes a message to SAP_B2 (403). To each of the possible communication paths between SMP_A and SMP_B, a communication area "REQ OUTPUT" has been assigned. In our example, the communication path comprises the SAP_A3 as the sender of the request message, and the SAP_B2 as the receiver of the request message. Therefore, the communication area assigned to this communication path is "3-2 REQ OUTPUT" (407).

SAP_A3 (400) gathers the information for the message and loads it (406) into the communication area "3-2 REQ OUTPUT" (407) in the memory of SMP_A. Thus, SAP_A3 (400) performs a write access to its own memory (404).

Next, SAP_A3 (400) sends a remote control command R_CTRL (408) via IOA_A (401) to IOA_B (402). This command sets both the REQ-latch (409) and the BUSY-latch (410) under the condition that the BUSY-latch has not been active when the command arrived. There is an immediate response to the R_CTRL which is received by SAP_A3 (400), which indicates the result of the R_CTRL. In this example it shall be assumed that the remote operation is successfully completed and that both the BUSY-latch (410) and the REQ-latch (409) are set.

In each of the I/O adapters IOA_A (401) and IOA_B (402), there exists one REQ-latch and one BUSY-latch per communication path. In our example, REQ-latch 409 and BUSY-latch 410 are assigned to the communication path from SAP_A3 (400) to SAP_B2 (403). Therefore, whenever the REQ-latch 409 is set, SAP_B2 (403) may conclude there is a message from SAP_A3 (400) for SAP_B2 (403).

In the next step, an interrupt (411) to the destination SAP, in our example to SAP_B2 (403), is caused by the REQ-latch 409 being set. This interrupt starts a corresponding microcode routine in SAP_B2 (403).

Since there exists one REQ interrupt per message path, the respective REQ-bit of the vector of REQ-bits can be mapped to the start address of the corresponding communication area in the remote system's memory. SAP_B2 (403) can map the interrupt information to the memory address of the corresponding communication area 407, "3-2 REQ OUTPUT", in SMP_A. This translation is performed by the microcode routine in SAP_B2 that has been started by the interrupt (411).

In order to access this communication area, SAP_B2 (403) activates the direct memory adapter DMA_B (413) in IOA_B (402) by means of a control command CTRL (412).

DMA_B (413) generates the remote fetch command R_FETCH (414) in order to access the corresponding communication area in the remote system's memory, which is the communication area "3-2 REQ OUTPUT" (407).

The contents of SMP_A's communication area "3-2 REQ OUTPUT" (407) are transferred (415) to the communication area 416 in SMP_B, "2-3 REQ INPUT".

As soon as this data transfer is completed, DMA_B (413) initiates an interrupt to SAP_B2 (403), in order to signal that the message of SAP_A3 (400) has successfully arrived in the communication area 416 of MEMORY_B (405), which SAP_B2 (403) can directly access.

In the next step, the destination system assist processor SAP_B2 reads the contents of communication area 416 "2-3 REQ INPUT". It then resets, by means of a control command CTRL (419), the REQ-latch 409 for indicating that the message is received. SAP_B2 then interprets the message and starts the requested task. If no immediate response message is to be issued, SAP_B2 also resets the BUSY-latch 410 with a control command CTRL (420). As soon as the BUSY-latch 410 is reset, the communication path between SAP_A3 (400) and SAP_B2 (403) can be used again by either SAP_A3 or SAP_B2 for message passing. The rule is, whoever is successful in setting the respective BUSY-latch may use the corresponding communication path.

Next, the transmission of a response message is to be discussed. Normally a task for the receiver SAP takes rather long. Therefore, the response to a request from the sender SAP will occur after many more of the requests have been received by the receiver SAP. This is the reason why response messages have to be sent from the receiver SAP independently of the request messages from the sender SAP. The sender SAP as well as the receiver SAP have to compete for the usage of the message path by setting the BUSY-latch.

Let us assume that SAP_B2 (403) has performed the requested task and intends to transmit a response message, via IOA_B (402) and IOA_A (401), to SAP_A3 (400). First, the response message is forwarded (430), from SAP_B2, to the communication area "2-3 RESP OUTPUT" (431) in MEMORY_B (405). Next, SAP_B2 sets the BUSY-latch (410) corresponding to the communication path from SAP_B2 to SAP_A3 by means of a control command CTRL (432), which is issued to IOA_B (402). By checking the response status of the CTRL command, SAP_B2 verifies that the operation has been successful.

In the following step the RESP-latch (434) in the I/O adapter IOA_A (401) of SMP_A is set by the remote control command R_CTRL (433) from SAP_B2. As there exists a whole set of RESP-latches corresponding to the various communication paths between SMP_A and SMP_B, RESP-latch 434 signals that the communication path for a response message from SAP_B2 (403) to SAP_A3 (400) is to be used.

Next, an interrupt (435) to the destination system assist processor SAP_A3 is caused by the RESP-latch 434, and a corresponding microcode routine in SAP_A3 is activated. Because RESP-bit 434 of the vector of RESP-status bits contains the information about the communication paths can be mapped to the start address of the communication area in the remote system's memory, with said communication area corresponding to said communication path. In our example, the communication area in the memory of SMP_B that is to be accessed is "2-3 RESP OUTPUT" (431).

A control command CTRL (436) is forwarded to the direct memory access adapter DMA_A (437) in IOA_A (401), which then generates a remote fetch command R_FETCH (438), in order to transfer the response message stored in the communication area 431, "2-3 RESP OUTPUT", from MEMORY_B to the corresponding communication area "3-2 RESP INPUT" (440) in MEMORY_A. This transfer (439) from MEMORY_B to MEMORY_A is directed by DMA_A (437). As soon as the transfer of the response message is completed, the DMA_A 437 interrupts (441) the system assist processor that has to receive the response message, in our example, SAP_A3 (400).

Next, SAP_A3 reads (442) the message from the communication area 440 in its own MEMORY_A (404), and it resets the RESP-latch with a control command CTRL (443), which is forwarded to IOA_A (401). In case the receiving SAP, SAP_A3, has no new request message pending, it resets the BUSY-latch 410 in IOA_B with a remote control command R_CTRL (444).

The message transfer scheme described so far shows several similarities to the principles of fax polling. When a SAO intends to forward a message to another system, it puts the message to be transferred in a defined communication area of its own memory, and signals to the peer system, by setting a bit in a whole vector of bits corresponding to the different communication paths, where said message can be found. The task of actually accessing the message in the initiator system's memory has to be performed by the destination system. When "the bell rings", the destination SAO has to initiate, via a direct memory access adapter, the message transfer from the remote system's memory to the own memory. This corresponds to fax polling. If one wants to obtain a certain document, one has to call the remote fax station that has said document stored in its memory, and transfer said document to the own fax station.

Figure 5:
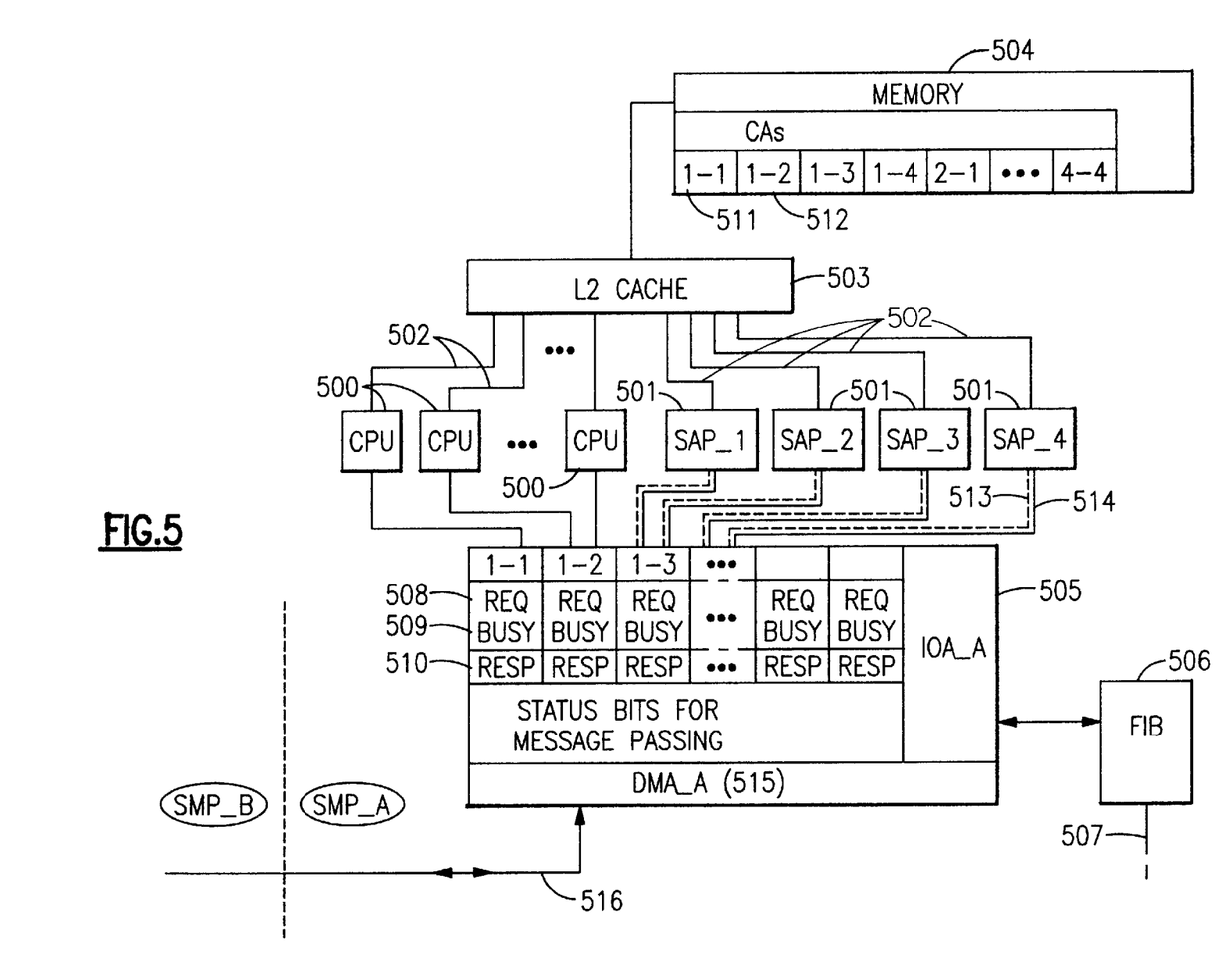
FIG. 5 shows how the various communication areas are accommodated in the memory of the respective multiprocessor system and depicts the I/O adapter status bits for message passing.

In FIG. 5, the hardware required for said method of message passing is shown. Two computer systems, SMP_B and SMP_A are connected by intersystem link 516, which connects the I/O adapter IOA_B of SMP_B to IOA_A (505) of SMP_A.

Each of the multiprocessor systems SMP_B and SMP_A comprises several CPUs (500), which are connected, via processor busses 502, to a shared level 2 cache (503). Via said L2 cache, the CPUs exchange data lines with the main memory 504. Another set of processors, the system assist processors (SAPs, 501), is dedicated the management of I/O traffic between the system's I/O devices, such as magnetic drives, and the main memory. Said I/O devices are attached (507), via a number of I/O chips such as the FIB (fast internal bus chip, 506), to the I/O adapter IOA_A (505). In the solution shown in FIG. 5, the I/O adapter is directly coupled to the CPUs and the SAPs, and I/O data is forwarded to the memory via the processor busses 502.

It is assumed that there exist 4 system assist processors SAP_1, SAP_2, SAP_3 and SAP_4 (501) in each of the multiprocessor systems. As each of the system assist processors of SMP_A has to be able to exchange messages with each of the SAPs of SMP_B, 4×4=16 communication paths are required for each direction of message passing. There do exist 16 communication areas in the main memory 504. For example, communication area "1-1" (511) is the buffer for messages from SAP_1 of SMP_A to SAP_1 of SMP_B, and vice versa. Accordingly, the communication area "1-2" (512) temporarily holds messages which are exchanged between SAP_1 of SMP_A and SAP_2 of SMP_B, and communication area "2-1" corresponds to the communication path between SAP_2 of SMP_A and SAP_1 of SMP_B.

Each of the communication areas is partitioned into four different buffers; for example, the communication area "3-2" is segmented into a buffer "3-2 REQ OUTPUT" (407), which is the out-buffer for requests, a buffer "3-2 RESP OUTPUT", which is the out-buffer for responses, a buffer "3-2 REQ INPUT", which is the in-buffer for requests from any other system, and a buffer "3-2 RESP INPUT" (440), which is the in-buffer for responses from any other system. These four subsections, taken together, represent the communication area "3-2".

For each communication area, there exist three status bits in the I/O adapter IOA_A (505) for message passing. To each communication area, a REQ-latch (508), a BUSY-latch (509), and a RESP-latch (510) is assigned. Thus, in the IOA_A, there exists a REQ-vector comprising 16 REQ-bits 508, a BUSY-vector comprising 16 BUSY-bits 509, and a RESP-vector comprising 16 RESP-bits 510. Whenever a request message is to be forwarded to SMP_A, which comes from any of SMP_B's SAPs, the respective REQ-bit in the REQ-vector is set. For example, if REQ bit "1-3" is set, this means that there is a request message for SAP_1 of SMP_A, which comes from SAP_3 of SMP_B. The REQ bit "1-3" causes an interrupt to SAP_1 of SMP_A, and, in response to said interrupt, SAP_1 accesses, via DMA_A 515 and the intersystem link 516, the corresponding communication area in the memory of SMP_B.

Accordingly, when one of the RESP-bits (510) is set for example the RESP-bit "3-2", this implies that there is a response message for SAP_3 of SMP_A, which comes from SAP_2 of SMP_B. Via a separate interrupt line, SAP_3 is notified that there is a message in SMP_B to be fetched. SAP_3 can map the RESP-bit "3-2" to the correct start address of the corresponding communication area in SMP_B that contains said response message. SAP_3 then accesses, via DMA_A (515) and via the link 516, the respective communication area in the memory of SMP_B, in order to transfer the message to SMP_A. No matter whether request or response messages are passed between the computer systems, the busy-bit corresponding to the communication path that is used for passing the message has to be set. After a certain message has been passed, the busy-bit is reset. Thus, the busy-bits provide an arbitration scheme for each of the 32 communication paths (16 communication paths from SMP_A to SMP_B, and 16 communication paths from SMP_B to SMP_A). By means of the busy-latch, it is made sure that any message passing that is actually processed on one of the 32 communication paths has to be completed before a new message can be transferred on the same path.

We claim:

1. A method for exchanging data among a plurality of computer systems by messages passing across a communication path between a computer system A having its own memory and a computer system B also having its own memory, a) writing communication message data that is to be transmitted from computer system A to computer system B into a communication message data area portion of computer system's A own memory which is assigned to be a part of a communication path from computer system A to computer system B;

b) setting an indication signal in said computer system B whereby said indication signal corresponds to said communication message data area portion of the memory of computer system A; and c) performing a fetch initiated by computer system B while it only is allowed read access to a remote systems memory, a remote read access to the data in said communication message data area portion of the memory of the remote computer system A for passing from the memory of computer system A the communication message data that was written into the memory of computer system A to the computer system B and fetched from said communication message data area portion of said computer system A's own memory by said remote read access from computer system B; and further comprising the steps of:

after setting an indication signal as a vector which can be mapped to the start address of a communication area portion of computer system B's own memory in a latch section assigned to a communication path from the computer system A to computer system B to indicate that there is a message stored in said communication message data area portion of said computer system A's own memory ready to be sent from computer system A to computer system B whereby said indication signal vector corresponds to said communication message data area portion of the memory of computer system A, an interrupt is initiated at computer system B as soon as said indication signal has been set in said latch section, said interrupt causing a microcode routine to perform a translation to map the interrupt information to the memory address of the corresponding communication message data area in communication system A; and wherein said latch section assigned to a communication path from the computer system A to computer system B to indicate that there is a message stored in said communication message data area portion of said computer system A's own memory ready to be sent from computer system A to computer system B and into which said indication signal vector is set and interrupt taken, has a busy portion and a request portion, and said exchange further comprising the steps of:

before said data exchange is started by setting an indication signal in said computer system B whereby said indication signal corresponds to said communication message data area portion of the memory of computer system A, said busy portion controls by its active setting whether or not said request portion can be set for data exchange, and after said request portion is set with said vector in said latch section, said computer system B generates a remote fetch in order to access the corresponding communication message data area portion of said computer system A's own memory whereupon the contents thereof are transferred into a communication messages data area portion of said computer system B's own memory, and as soon as this data is completed said computer system B signals the successful arrival in its communication message data area, and reads the contents thereof into its computer system B's own memory, and it then resets said request portion in said latch section to indicate completion of the data exchange, and further comprising the steps of:

after the contents of the message exchanged between computer system A and computer system B have been received and the request portion in the latch section has been reset, said computer system B interprets the message and starts the requested task, and if no immediate response message is to be issued, said computer system B also resets the busy portion of the latch section to allow usage of the just used communication path between the computer system A and computer system B again for message passing.

2. A method for exchanging data among a plurality of computer systems by messages passing across a communication path between a computer system A having its own memory and a computer system B also having its own memory, according to claim 1, further comprising the steps of:

setting the busy portion of the latch section to reuse the communication path between computer system A and computer system B by either computer system controls the use of the corresponding communication path from a communication message data area.

3. A method for exchanging data among a plurality of computer systems by messages passing across a communication path between a computer system A having its own memory and a computer system B also having its own memory, according to claim 2, further comprising the steps of:

before a computer system of said plurality of computer systems sends a new message for data exchange between computer systems of the system, it first transmits said new message to its own memory's communication message data area portion for storage, and then it sets the busy portion of the latch section to reuse the communication path between it and another computer system which is to receive the message by reading the new message from its own memory's communication message data area portion where said new message has been stored to control the use of the corresponding communication path from its said new message's communication message data area, and the other computer system's communication message data area.

4. A method for exchanging data among a plurality of computer systems by messages passing across a communication path between a computer system A having its own memory and a computer system B also having its own memory, according to claim 1, wherein said latch section is provided in an I/O adapter of the receiving computer system and said vector includes a bit representing one of the communications paths from the sending computer system A to the receiving computer system B.

5. Data exchange means for use in exchanging messages among a plurality of intercoupled computer systems and from a computer system A of said plurality and a computer system B of said plurality, comprising:

for said data exchange two computer systems, designated A and B, each computer system having a like configuration, and wherein a computer system, designated A, having a system processor and having its own memory accessible for read/write storage by said system processor and accessible only by a read fetch from another computer system of said plurality, and having I/O capability, having a communication processor means including means for reading and writing data into or from at least one communication message data area portion of said memory of its computer system for storing messages to be exchanged by writing communication message data that is to be transmitted from its computer system to another like computer system of said plurality, designated A and B respectively, into said communication processors means associated communication message data area portion of computer system A's own memory which is assigned to be a part of a communication path from computer system A to computer system B;

said communication processor means including means for setting an indication signal in another computer system of said plurality designated as a computer system B whereby said indication signal corresponds to said communication message data area portion of the memory of said computer system, which is designated A; and said communication processor means includes a latch section provided for I/O by at least two interrupt latches and one busy latch, each of said interrupt latches pointing to a segment in said computer system's own memory which serves as a communication message data area portion, whereby a fetch initiated by said computer system B while it only is allowed read access to said computer system's own memory, said allowed remote read access to the data in said communication message data area portion of the memory of said computer system A passes message data stored in said communication message data area of the memory of said computer system a that communication message data that was written into the memory of computer system A for a particular data exchange by the said communication processor means of computer system A into the said portion of the memory of said computer system A to be fetched from said communication message data area portion of said computer system A's own memory by said allowed remote read access from computer system B;

wherein said means for after setting an indication signal includes providing a vector which can be mapped to the start address of a communication area portion of computer system B's own memory into said latch section assigned to a communication path from the computer system A to computer system B and setting said vector into an interrupt latch as a request latch setting to indicate that there is a message stored in said communication message data area portion of said computer system A's own memory ready to be sent from computer system A to computer system B whereby said indication signal vector corresponds to said communication message data area portion of the memory of computer system A, and means for providing microcode for execution after an interrupt is initiated at computer system B as soon as said indication signal has been set in said latch section, said interrupt causing a routine of said microcode to perform a translation to map the interrupt information to the memory address of the corresponding communication message data area in communication system A, and wherein:

said latch section provided for I/O by said interrupt latches and one busy latch, in which each of said interrupt latches pointing to a segment in said computer system's own memory which serves as a communication message data area portion, are started for data exchange by said means for by setting an indication vector bit signal in said computer system B whereby said indication bit signal corresponds to said communication message data area portion of the memory of computer system A, and said busy latch when reset allows any computer system of the plurality to activate a communication path by setting said busy path for data exchange, and wherein, means are provided, after said request portion is set with said vector in said latch section, for said computer system B to generate a remote fetch in order to access the corresponding communication message data area portion of said computer systems A's own memory whereupon the contents thereof are transferred into a communication message data area portion of said computer system B's own memory, and as soon as this data is completed said computer system B signals the successful arrival in its communication message data area, and reads the contents thereof into its computer system B's own memory, and it then resets said request portion in said latch section to indicate completion of the data exchange and allow usage of a just used communication path between computer system A and computer system B again for messaging.

6. Data exchange means for use in exchanging messages among a plurality of intercoupled computer systems and from a computer system A of said plurality and a computer system B of said plurality according to claim 5 wherein:

said interrupt latches and busy latch are provided in an I/O adapter for said computer system having its own memory.

7. Data exchange means for use in exchanging messages among a plurality of intercoupled computer systems and from a computer system A of said plurality and a computer system B of said plurality according to claim 6 wherein:

a bit of said vector represents a specific communication path in both said interrupt and busy latches, allowing a request or a response message to be stored in different communication message data areas of memory.

\* \* \* \* \*